US006953510B1

United States Patent
Mackay et al.

(10) Patent No.: US 6,953,510 B1
(45) Date of Patent: Oct. 11, 2005

(54) METHOD OF MAKING MICROPOROUS BREATHABLE FILM

(75) Inventors: John H. Mackay, Lake Zurich, IL (US); Kevin A. Brady, Cary, IL (US)

(73) Assignee: Tredegar Film Products Corporation, Richmond, VA (US)

( * ) Notice: Subject to any disclaimer, the term of this patent is extended or adjusted under 35 U.S.C. 154(b) by 0 days.

(21) Appl. No.: 09/418,237

(22) Filed: Oct. 14, 1999

Related U.S. Application Data
(60) Provisional application No. 60/104,948, filed on Oct. 20, 1998, and provisional application No. 60/104,455, filed on Oct. 16, 1998.

(51) Int. Cl.[7] .......................... B29C 55/18; B32B 31/00
(52) U.S. Cl. ...................... 156/229; 156/160; 156/164; 264/210.1
(58) Field of Search ................................ 156/160, 164, 156/182, 183, 229, 290; 428/315.5, 500, 312.2, 304.4, 315.9; 264/41, 42, 154, 210.2, 288.8, 284, 210.1

(56) References Cited

U.S. PATENT DOCUMENTS

| | | |
|---|---|---|
| 3,233,029 A | 2/1966 | Rasmussen |
| 3,299,174 A | 1/1967 | Kuhre et al. |
| 3,378,512 A | 4/1968 | Hamed et al. |
| 3,407,253 A | 10/1968 | Yoshimura et al. |
| 3,424,649 A | 1/1969 | Nyberg et al. |
| 3,426,754 A | 2/1969 | Bierebaum et al. |
| 3,562,356 A | 2/1971 | Nyberg et al. |
| 3,642,967 A | 2/1972 | Doll |
| 3,654,929 A | 4/1972 | Nilsson et al. |
| 3,678,134 A | 7/1972 | Middlebrook |
| 3,683,917 A | 8/1972 | Comerford |
| 3,758,661 A | 9/1973 | Yamamoto et al. |
| 3,832,267 A | 8/1974 | Liu |
| 3,840,418 A | 10/1974 | Sabee |
| 3,903,234 A | 9/1975 | Ikeda et al. |
| RE28,606 E | 11/1975 | Ikeda et al. |
| 3,927,144 A | 12/1975 | Hayashi et al. |
| 3,941,859 A | 3/1976 | Batiuk et al. |
| 4,076,698 A | 2/1978 | Anderson et al. |
| 4,091,164 A * | 5/1978 | Schwarz ..................... 427/221 |
| 4,116,892 A * | 9/1978 | Schwarz ....................... 521/62 |
| 4,116,914 A | 9/1978 | Coran et al. |
| 4,131,654 A | 12/1978 | Herman et al. |
| 4,132,698 A | 1/1979 | Gessler et al. |
| 4,134,951 A | 1/1979 | Dow et al. |
| 4,135,023 A | 1/1979 | Lloyd et al. |
| 4,144,008 A | 3/1979 | Schwarz |
| 4,153,664 A | 5/1979 | Sabee |
| 4,171,411 A | 10/1979 | Ehrenfreund |
| 4,173,612 A | 11/1979 | Kelly |

(Continued)

FOREIGN PATENT DOCUMENTS

| | | | |
|---|---|---|---|
| AU | 577644 | 9/1988 | ........... B32B/33/00 |
| AU | 621048 | 4/1989 | ............. B32B/5/24 |
| CA | 1296225 | 2/1992 | ........... B01D/67/00 |

(Continued)

OTHER PUBLICATIONS

Product Information sheet for Tufrene™ A from Asahi Kasei Corporation (2001).*

Van A. Wente "Superfine Thermoplastic Fibers" Industrial Engineering Chemistry, Aug., 1956, vol. 48, No. 8, pp. 1342–1346.

Notification of Transmittal of the International Search Report or the Declaration (3 pages) and International Search Report (3 pages) for PCT/US 99/23856 dated Jan. 24, 2000.

*Primary Examiner*—Sue A. Purvis
(74) *Attorney, Agent, or Firm*—Joseph A. Tessari

(57) ABSTRACT

A polyolefin microporous breathable film having improved tear and impact strength as well as a soft feel is provided by a film including a polypropylene precursor film and a filler. Other embodiments include a second polymer component.

12 Claims, 4 Drawing Sheets

U.S. PATENT DOCUMENTS

| | | |
|---|---|---|
| 4,205,021 A | 5/1980 | Morita et al. |
| 4,212,787 A | 7/1980 | Matsuda et al. |
| 4,220,579 A | 9/1980 | Rinehart |
| 4,220,879 A | 9/1980 | Hoshimi et al. |
| 4,223,059 A | 9/1980 | Schwarz |
| 4,243,576 A | 1/1981 | Fischer et al. |
| 4,251,585 A | 2/1981 | Schwarz |
| 4,253,461 A | 3/1981 | Strickland et al. |
| 4,277,578 A | 7/1981 | Yoshimura et al. |
| 4,285,100 A | 8/1981 | Schwarz |
| 4,289,832 A | 9/1981 | Schwarz |
| 4,298,647 A | 11/1981 | Cancio et al. |
| 4,303,571 A | 12/1981 | Jansen et al. |
| 4,303,712 A | 12/1981 | Woodroof |
| 4,303,714 A | 12/1981 | Mercer |
| 4,318,408 A | 3/1982 | Korpman |
| 4,329,309 A | 5/1982 | Kelly |
| 4,331,622 A | 5/1982 | Doi et al. ............... 264/45.3 |
| 4,335,193 A | 6/1982 | Doi et al. ............... 429/251 |
| 4,344,999 A | 8/1982 | Gohlke |
| 4,350,655 A | 9/1982 | Hoge |
| 4,351,784 A | 9/1982 | Thomas et al. ............ 264/22 |
| 4,352,355 A | 10/1982 | Mesek et al. |
| 4,353,945 A | 10/1982 | Sampson |
| 4,357,439 A | 11/1982 | Blumel et al. |
| 4,368,565 A | 1/1983 | Schwarz |
| 4,378,067 A | 3/1983 | Butler et al. |
| 4,380,564 A | 4/1983 | Cancio et al. |
| 4,402,688 A | 9/1983 | Julemont |
| 4,418,112 A | 11/1983 | Toyoda et al. ............ 428/212 |
| 4,425,127 A | 1/1984 | Suzuki et al. |
| 4,425,129 A | 1/1984 | Karami |
| 4,427,737 A | 1/1984 | Cilento et al. |
| 4,435,141 A | 3/1984 | Weisner et al. |
| 4,436,520 A | 3/1984 | Lipko et al. |
| 4,438,167 A | 3/1984 | Schwarz ................. 428/138 |
| 4,440,911 A | 4/1984 | Inoue et al. |
| 4,449,977 A | 5/1984 | Korpman |
| 4,450,026 A | 5/1984 | Pieniak et al. |
| 4,460,646 A | 7/1984 | Inoue et al. |
| 4,465,729 A | 8/1984 | Cancio et al. |
| 4,472,328 A * | 9/1984 | Sugimoto et al. ........... 264/41 |
| 4,476,180 A | 10/1984 | Wnuk |
| 4,479,989 A | 10/1984 | Mahal |
| 4,480,061 A | 10/1984 | Coughlin et al. |
| 4,485,133 A | 11/1984 | Ohtsuka et al. |
| 4,517,714 A | 5/1985 | Sneed et al. |
| 4,525,531 A | 6/1985 | Zukosky et al. |
| 4,527,989 A | 7/1985 | Karami |
| 4,534,769 A | 8/1985 | De Jonckheere et al. |
| 4,535,020 A | 8/1985 | Thomas et al. ............ 428/131 |
| 4,585,447 A | 4/1986 | Karami |
| 4,585,604 A | 4/1986 | Okuyama et al. |
| 4,590,020 A | 5/1986 | Itaba et al. |
| 4,590,202 A | 5/1986 | Remy |
| 4,626,252 A | 12/1986 | Nishizawa et al. |
| 4,636,340 A | 1/1987 | Itaba et al. |
| 4,639,487 A | 1/1987 | Hazelton et al. |
| 4,639,949 A | 2/1987 | Ales et al. |
| 4,640,859 A | 2/1987 | Hansen et al. |
| 4,657,539 A | 4/1987 | Hasse |
| 4,663,220 A | 5/1987 | Wisneski et al. |
| 4,673,619 A | 6/1987 | Itaba et al. |
| 4,681,580 A | 7/1987 | Reising et al. |
| 4,681,781 A | 7/1987 | Murray et al. |
| 4,684,578 A | 8/1987 | Inoue et al. |
| 4,704,238 A | 11/1987 | Okuyama et al. |
| 4,705,812 A | 11/1987 | Ito et al. ................. 521/92 |
| 4,713,068 A | 12/1987 | Wang et al. |
| 4,713,069 A | 12/1987 | Wang et al. |
| 4,714,735 A | 12/1987 | Hodgson, Jr. et al. |
| 4,716,197 A | 12/1987 | Seiss et al. ................ 525/75 |
| 4,719,144 A | 1/1988 | Kamat |
| 4,721,592 A | 1/1988 | Fruehauf et al. |
| 4,725,481 A | 2/1988 | Ostapchenko |
| 4,734,324 A | 3/1988 | Hill |
| 4,740,258 A | 4/1988 | Breitscheidel |
| 4,758,297 A | 7/1988 | Calligarich |
| 4,775,375 A | 10/1988 | Aledo |
| 4,777,703 A | 10/1988 | Knox |
| 4,791,144 A | 12/1988 | Nagou et al. |
| 4,793,956 A | 12/1988 | Nogiwa et al. |
| 4,806,300 A | 2/1989 | Walton et al. ............ 264/288 |
| 4,808,252 A | 2/1989 | Lash |
| 4,814,124 A | 3/1989 | Aoyama et al. |
| 3,860,003 | 4/1989 | Buell |
| 4,820,590 A | 4/1989 | Hodgson, Jr. et al. |
| 4,824,718 A | 4/1989 | Hwang |
| 4,829,096 A | 5/1989 | Kitamura et al. |
| 4,833,172 A | 5/1989 | Schwarz et al. ............ 521/62 |
| 4,848,564 A | 7/1989 | Scheller et al. |
| 4,877,679 A | 10/1989 | Leatherman et al. |
| 4,878,974 A | 11/1989 | Kagawa .................. 156/85 |
| 4,879,078 A | 11/1989 | Antoon, Jr. |
| 4,891,392 A | 1/1990 | Abe et al. |
| 4,902,553 A | 2/1990 | Hwang et al. |
| 4,921,653 A | 5/1990 | Aoyama et al. |
| 4,921,749 A | 5/1990 | Bossaert et al. |
| 4,923,650 A | 5/1990 | Antoon, Jr. et al. |
| 4,929,303 A | 5/1990 | Sheth |
| 4,957,943 A | 9/1990 | McAllister et al. |
| 4,977,014 A | 12/1990 | Mitchell et al. |
| 4,978,570 A | 12/1990 | Heyn et al. |
| 4,995,930 A | 2/1991 | Merz et al. |
| 5,008,204 A | 4/1991 | Stehling |
| 5,008,296 A | 4/1991 | Antoon, Jr. et al. .......... 521/91 |
| 5,026,798 A | 6/1991 | Canich |
| 5,032,450 A | 7/1991 | Rechlicz et al. |
| 5,034,078 A | 7/1991 | Hodgson, Jr. et al. |
| 5,035,338 A | 7/1991 | Kaufhold et al. |
| 5,055,338 A * | 10/1991 | Sheth et al. ............. 428/155 |
| 5,066,526 A | 11/1991 | German, Jr. |
| 5,068,138 A | 11/1991 | Mitchell et al. |
| 5,091,228 A * | 2/1992 | Fujii et al. ............... 428/34.2 |
| 5,106,545 A | 4/1992 | Warren |
| 5,126,391 A | 6/1992 | Yamamoto et al. |
| 5,145,747 A | 9/1992 | Jottier |
| 5,167,652 A | 12/1992 | Mueller |
| 5,169,712 A | 12/1992 | Tapp |
| 5,174,231 A | 12/1992 | White |
| 5,182,069 A | 1/1993 | Wick |
| 5,198,401 A | 3/1993 | Turner et al. |
| 5,206,075 A | 4/1993 | Hodgson, Jr. |
| 5,241,031 A | 8/1993 | Mehta |
| 5,272,236 A | 12/1993 | Lai et al. |
| 5,278,272 A | 1/1994 | Lai et al. |
| 5,296,184 A | 3/1994 | Wu et al. |
| 5,317,035 A | 5/1994 | Jacoby et al. |
| 5,322,728 A | 6/1994 | Davet et al. |
| 5,328,760 A | 7/1994 | Gillberg-LaForce |
| 5,358,792 A | 10/1994 | Mehta et al. |
| 5,364,695 A | 11/1994 | Gurewitz .................. 428/323 |
| 5,376,439 A | 12/1994 | Hodgson et al. |
| 5,382,461 A | 1/1995 | Wu .......................... 428/86 |
| 5,382,630 A | 1/1995 | Stehling et al. |
| 5,385,769 A | 1/1995 | Wick |
| 5,385,972 A | 1/1995 | Yamamoto et al. |
| 5,399,396 A | 3/1995 | Ohlsson et al. |
| 5,409,761 A | 4/1995 | Langley |
| 5,415,905 A | 5/1995 | Middlesworth et al. |
| 5,445,862 A | 8/1995 | Kaneko et al. ............. 428/148 |

| | | | |
|---|---|---|---|
| 5,447,788 A | 9/1995 | Rhim et al. | |
| 5,451,450 A | 9/1995 | Erderly et al. | |
| 5,470,811 A | 11/1995 | Jejelowo et al. | |
| 5,472,775 A | 12/1995 | Obijeski et al. | |
| 5,500,260 A | 3/1996 | Halle et al. | |
| 5,500,360 A | 3/1996 | Ahlquist et al. | |
| 5,516,563 A | 5/1996 | Schumann et al. | |
| 5,525,659 A | 6/1996 | Falla et al. | |
| 5,549,777 A | 8/1996 | Langdon et al. | |
| 5,558,930 A | 9/1996 | DiPoto | 428/216 |
| 5,560,974 A | 10/1996 | Langley | |
| 5,565,250 A | 10/1996 | Ohlsson et al. | |
| 5,571,619 A | 11/1996 | McAlpin et al. | |
| 5,575,785 A | 11/1996 | Gryskiewicz et al. | 604/385.2 |
| 5,580,910 A | 12/1996 | Isaac et al. | |
| 5,580,914 A | 12/1996 | Falla et al. | |
| 5,674,944 A | 10/1997 | Falla et al. | |
| 5,690,949 A | 11/1997 | Weimer et al. | |
| 5,695,868 A * | 12/1997 | McCormack | 428/283 |
| 5,695,871 A | 12/1997 | Tallentire et al. | |
| 5,714,547 A | 2/1998 | Li et al. | |
| 5,738,111 A | 4/1998 | Weimer et al. | |
| 5,783,270 A | 7/1998 | Fischer et al. | |
| 5,800,758 A | 9/1998 | Topolkaraev et al. | |
| 5,865,926 A | 2/1999 | Wu et al. | |
| 5,910,225 A | 6/1999 | McAmish et al. | 156/229 |
| 5,955,187 A * | 9/1999 | McCormack et al. | 428/315.5 |
| 6,072,005 A * | 6/2000 | Kobylivker et al. | 524/536 |
| 6,096,014 A | 8/2000 | Haffner et al. | |
| H1955 H | 4/2001 | Middlesworth et al. | |
| 6,258,308 B1 * | 7/2001 | Brady et al. | 264/210.2 |
| 6,264,864 B1 | 7/2001 | Mackay | |
| H2000 H | 11/2001 | Middlesworth et al. | |
| 6,706,228 B2 * | 3/2004 | Mackay | 264/154 |

FOREIGN PATENT DOCUMENTS

| | | | | |
|---|---|---|---|---|
| CA | 1311181 | 12/1992 | | B32B/27/06 |
| CA | 1322082 | 9/1993 | | C08J/5/18 |
| CA | 2144737 | 3/1994 | | C08L/23/08 |
| CA | 2130192 | 2/1998 | | C08F/210/16 |
| DE | 2 035 117 | 1/1971 | | |
| DE | 3233693 | 3/1984 | | |
| DE | 3436065 | 4/1986 | | |
| DE | 3850987 | 9/1994 | | |
| DE | 4 311 422 | 10/1994 | | |
| EP | 0 032 804 A2 | 7/1981 | | C08L/23/08 |
| EP | 0 069 297 | 1/1983 | | |
| EP | 0 114 964 A1 | 8/1984 | | A61J/1/00 |
| EP | 0 119 815 A2 | 9/1984 | | C08L/71/00 |
| EP | 0 119 827 A2 | 9/1984 | | A41B/13/02 |
| EP | 0 159 102 A1 | 10/1985 | | |
| EP | 0 193 938 A2 | 9/1986 | | B32B/27/10 |
| EP | 0 114 964 B1 | 11/1986 | | A61J/1/00 |
| EP | 0 201 331 A2 | 11/1986 | | B29C/61/00 |
| EP | 0 219 198 A1 | 4/1987 | | C08J/5/18 |
| EP | 0 227 037 A2 | 7/1987 | | C08J/5/18 |
| EP | 0 232 060 A3 | 8/1987 | | C08J/5/18 |
| EP | 0 276 100 A1 | 1/1988 | | |
| EP | 0 119 827 B1 | 7/1988 | | A41B/13/02 |
| EP | 0 283 200 A2 | 9/1988 | | B29D/7/00 |
| EP | 0 283 200 A3 | 9/1988 | | B29D/7/00 |
| EP | 0 283 200 B1 | 9/1988 | | B29D/7/00 |
| EP | 0 288 021 A2 | 10/1988 | | C08J/5/18 |
| EP | 0 288 021 B1 | 10/1988 | | C08J/9/28 |
| EP | 0 288 021 A3 | 10/1988 | | C08J/9/28 |
| EP | 0 309 073 A2 | 3/1989 | | |
| EP | 0 201 331 B1 | 12/1989 | | B29C/61/00 |
| EP | 0 352 802 A2 | 1/1990 | | C08J/5/18 |
| EP | 0 352 802 A3 | 1/1990 | | C08J/5/18 |
| EP | 0 361 865 B1 | 4/1990 | | B29D/9/00 |
| EP | 0 361 865 A3 | 4/1990 | | B29D/9/00 |
| EP | 0 361 865 A2 | 4/1990 | | B29D/9/00 |
| EP | 0 193 938 B1 | 6/1990 | | B32B/27/10 |
| EP | 0 385 599 A2 | 9/1990 | | C08L/23/04 |
| EP | 0 385 599 A3 | 9/1990 | | C08L/23/04 |
| EP | 0 227 037 B1 | 7/1991 | | C08J/5/18 |
| EP | 0 219 198 B1 | 10/1991 | | C08J/5/18 |
| EP | 0 550 115 A3 | 12/1992 | | |
| EP | 0 550 115 A2 | 12/1992 | | |
| EP | 0 598 970 A1 | 6/1994 | | B26F/1/24 |
| EP | 0 691 203 A1 | 1/1996 | | B32B/31/04 |
| EP | 0 598 970 B1 | 5/1996 | | B26F/1/24 |
| EP | 0 742 248 A1 | 11/1996 | | C08L/5/18 |
| EP | 0 629 151 B1 | 12/1996 | | B29C/55/00 |
| EP | 0 662 988 B1 | 2/1997 | | C08L/23/04 |
| EP | 0 769 525 A1 | 4/1997 | | C08L/53/00 |
| EP | 0 682 678 B1 | 12/1998 | | C08J/5/18 |
| EP | 0 604 731 B1 | 6/1999 | | B23B/31/00 |
| EP | 0 598 970 B2 | 4/2000 | | B26F/1/24 |
| FR | 2074338 | 9/1971 | | |
| FR | 2446176 | 9/1980 | | |
| GB | 1312808 | 4/1973 | | |
| GB | 1 454 218 | 11/1976 | | D04H/13/00 |
| GB | 2 101 468 A | 1/1983 | | A41B/13/02 |
| GB | 2 115 702 A | 9/1983 | | A61F/13/16 |
| GB | 2 137 632 A | 10/1984 | | C08L/23/08 |
| GB | 2 151 538 A | 7/1985 | | C08J/5/18 |
| GB | 2 178 433 A | 2/1987 | | C08L/23/02 |
| GB | 2 285 408 A | 7/1995 | | C08J/5/18 |
| GB | 2 290 052 A | 12/1995 | | B32B/27/12 |
| JP | 48-60774 | 8/1973 | | |
| JP | 51-30856 | 3/1976 | | B29C/24/00 |
| JP | 54-120646 | 9/1979 | | C08L/25/10 |
| JP | 54-120658 | 9/1979 | | C08L/25/06 |
| JP | 55-110141 | 8/1980 | | |
| JP | 57-02350 | 1/1982 | | C08L/23/08 |
| JP | 57-117038 | 7/1982 | | |
| JP | 57-117039 | 7/1982 | | |
| JP | 58-129034 | 8/1983 | | |
| JP | 61-009448 | 1/1986 | | |
| JP | 61/284439 | 12/1986 | | |
| JP | 62-009842 | 1/1987 | | |
| JP | 62-169642 | 7/1987 | | |
| JP | 62-176843 | 8/1987 | | |
| JP | 62-179543 | 8/1987 | | |
| JP | 62-282003 | 12/1987 | | |
| JP | 64-49619 | 2/1989 | | |
| JP | 64-79620 | 3/1989 | | |
| JP | 1-144431 | 6/1989 | | |
| JP | 1-235439 | 9/1989 | | |
| JP | 1-264031 | 10/1989 | | |
| JP | 1-266150 | 10/1989 | | C08J/9/00 |
| JP | 2-036938 | 2/1990 | | |
| JP | HEI 2-276636 | 11/1990 | | |
| JP | 3-221540 | 9/1991 | | |
| JP | 7-116429 | 5/1995 | | B01D/39/16 |
| JP | 7-118431 | 5/1995 | | |
| PL | 175038 | 2/1994 | | |
| WO | WO 84/02707 | 7/1984 | | |
| WO | 93/03093 | 2/1993 | | C08L/23/04 |
| WO | 93/16863 | 9/1993 | | B29C/55/00 |
| WO | 94/01276 | 1/1994 | | B32B/7/06 |
| WO | 94/01376 | 1/1994 | | C04B/33/30 |
| WO | 94/06857 | 3/1994 | | C08L/23/04 |
| WO | 94/18263 | 8/1994 | | C08J/5/18 |
| WO | 95/02630 | 1/1995 | | C08J/5/18 |
| WO | 95/03765 | 2/1995 | | A61F/13/15 |
| WO | 95/07314 | 3/1995 | | C08J/3/22 |
| WO | 95/09199 | 4/1995 | | C08L/23/08 |
| WO | 95/16562 | 6/1995 | | B32B/5/24 |
| WO | 96/19346 | 6/1996 | | B32B/7/00 |
| WO | 96/39032 | 12/1996 | | A01N/25/34 |

| WO | 98/04397 | 2/1998 | ........... B29C/55/18 | WO | WO 98/29504 | 7/1998 | |
| WO | 98/05502 | 2/1998 | ........... B32B/31/12 | WO | 98/58799 | 12/1998 | ........... B32B/27/20 |
| WO | 98/24834 | 6/1998 | .............. C08J/5/18 | WO | WO 99/23139 | 5/1999 | |
| WO | 98/29247 | 7/1998 | ........... B32B/27/12 | | | | |
| WO | WO 98/29481 | 7/1998 | | | | | |
| WO | 98/29481 | 7/1998 | .............. C08J/5/18 | * cited by examiner | | | | ns
METHOD OF MAKING MICROPOROUS BREATHABLE FILM

This application claims the benefit of U.S. Provisional Patent Application 60/104,455 filed Oct. 16, 1998 and U.S. Provisional Patent Application 60/104,948 filed Oct. 20, 1998.

BACKGROUND OF THE INVENTION

1. Field

This invention relates generally to a polyolefin microporous breathable film and method of making same. More specifically this invention is directed toward filled polypropylene microporous breathable films having an improved Water Vapor Transmission Rate (WVTR), high tear strength, high dart impact strength, and a soft feel.

2. Definitions

As used therein the term "extrusion" is intended to include extrusion, coextrusion, extrusion coating, or combinations thereof, whether by tubular methods, planar methods, or combinations thereof.

An "oriented" material is defined herein as a material which, when heated to an appropriate temperature above room temperature (e.g., 96° C.), will have a free shrink of about 5% or greater in at least one linear direction.

Unless specifically set forth and defined or otherwise limited, the term "polymer" as used herein generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible molecular configurations of the material. These structures include, but are not limited to isotactic, syndiotactic and random molecular configurations.

The term "polyethylene" as used herein refers to families of resins obtained by substantially polymerizing the gas ethylene $C_2H_4$. Polyethylenes having densities ranging from about 0.900 g/cc to about 0.935 g/cc are typically called low density polyethylenes (LDPE).

The term "linear low density polyethylene" (LLDPE) as used herein for a type of polyethylene to be employed in the film of the invention, refers to the copolymers comprised of a major amount of ethylene with a minor amount of one or more comonomers selected from $C_3$ to about $C_{10}$ or higher alpha olefins such as butene-1,4-methyl petene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc, more preferably in the range of from about 0.912 g/cc to about 0.928 g/cc for film making purposes. The Melt Flow Index of LLDPE generally ranges from between about 0.1 to about 10.0 grams per ten minutes and preferably between from about 0.5 to about 3.0 grams per ten minutes. LLDPE resins of this type are commercially available and are manufactured in low pressure vapor phase and liquid phase processes using transition metal catalysts. LLDPE is well known for its structural strength and anti-stress cracking properties. Also, LLDPE is known for its favored properties in the heat shrink process, and thus is well suited to make a heat shrinkable film as discussed above. Also, very low density linear low density polyethylenes (VLDPE) may be employed, and such have a density from about 0.010 g/cc to about 0.860 g/cc, or less.

The term "polypropylene" as used herein which polypropylene is a type of polyolefin that may be employed in the film of the present invention, refers to families of resins obtained by substantially polymerizing the gas propylene, $C_3H_6$.

By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives.

BACKGROUND

Techniques for the preparation of films having good WVTR from highly filled polymers, usually polyefins, is known. In the past, a combination of a polyolefin, usually a polyethylene, with a filler, usually $CaCO_3$, while very useful and widely used as a film with good WVTR, often, but not necessarily, in combination with non-woven polymers (for use in diapers, adult incontinence devices, surgical garments, feminine hygiene articles, housewrap composites, protective apparel, roofing materials and the like), has exhibited some limitations that have become well known in the industry.

Among the most serious of the limitations of filled film polyethylene is the extreme difficulty in producing a cost effective lamination between polypropylene nonwoven materials and filled polyethylene breathable films. Traditional attachment techniques such as glue, hot melt, or melt blown adhesive techniques can be used, but these traditional attachment techniques all require the additional cost and process complexity of operating the laminating system as well as the cost of the adhesive itself. The preferred method of heat lamination to attach the filled polyethylene film to the polypropylene nonwoven materials was found to be generally not reliable because of the difference in the melting points of the polypropylene nonwoven material (about 161° C.) and the polyethylene film (about 125° C.). It has been found that to achieve an adequate lamination bond strength between these two materials, pin holes or damage to the filled polyethylene breathable film occurred at the bond site to the polypropylene nonwoven material.

Prior art polypropylene breathable films, while having lamination advantages over polyethylene films, have been deficient in a number of other performance categories. Specifically, prior art polypropylene films oriented by traditional Machine Direction Orientation, Transverse Direction Orientation, or Biaxial Orientation (all well known in the art) have exhibited very low tear and impact strength. In addition, the resultant polypropylene films were quite stiff, thus not suitable for providing a comfortable feel against human skin when used for disposables or garments.

For those applications wherein the polypropylene breathable film is not laminated directly to a nonwoven polypropylene, or which by the nature of the product, requires utilization of a hot melt type adhesive gluing system (such as a breathable film diaper backsheet), a polypropylene breathable film provides greater resistance to glue burn through. Thus, the use of a polypropylene breathable film assures product integrity. Also, the use of a polypropylene breathable film enables the use of higher temperature glues, as well as a smaller quantity of glue to achieve adequate product bond strength.

Accordingly, there is a commercial need for a polypropylene microporous breathable film with improved tear strength, improved dart impact strength, as well as a soft feel.

SUMMARY

We have discovered that producing a precursor film from a polypropylene and filler (preferably Calcium Carbonate) blend, then incrementally orienting the precursor film in the machine direction, or the transverse direction, or both, will yield a reasonably soft film (to the touch) with good dart impact and good tear strength. It was further discovered that adding a minority amount of a low density polyethylene to the polypropylene and filled blend greatly improves extrusion processability. It was further discovered that the addition of a minority amount of an elastomer or a plastomer further improved dart impact strength and tear strength, and contributed to an even softer film feel against human skin. Dart impact strength is approximately double that found in previously available polypropylene breathable films. Machine Direction tear strength is more than triple that found in previously available Machine Direction Oriented and Biaxially Oriented polypropylene breathable films. Transverse Direction tear strength is more than triple that found in previously available Transverse Direction Oriented and Biaxial Oriented polypropylene breathable films. Such dramatic improvements in the physical properties of films are unexpected and surprising.

BRIEF DESCRIPTION OF THE DRAWINGS

A better understanding of the Polyolefin Microporous Breathable Film of the present invention may be had from the drawing figures, wherein.

DETAILED DESCRIPTION

Introduction

Figure 1:
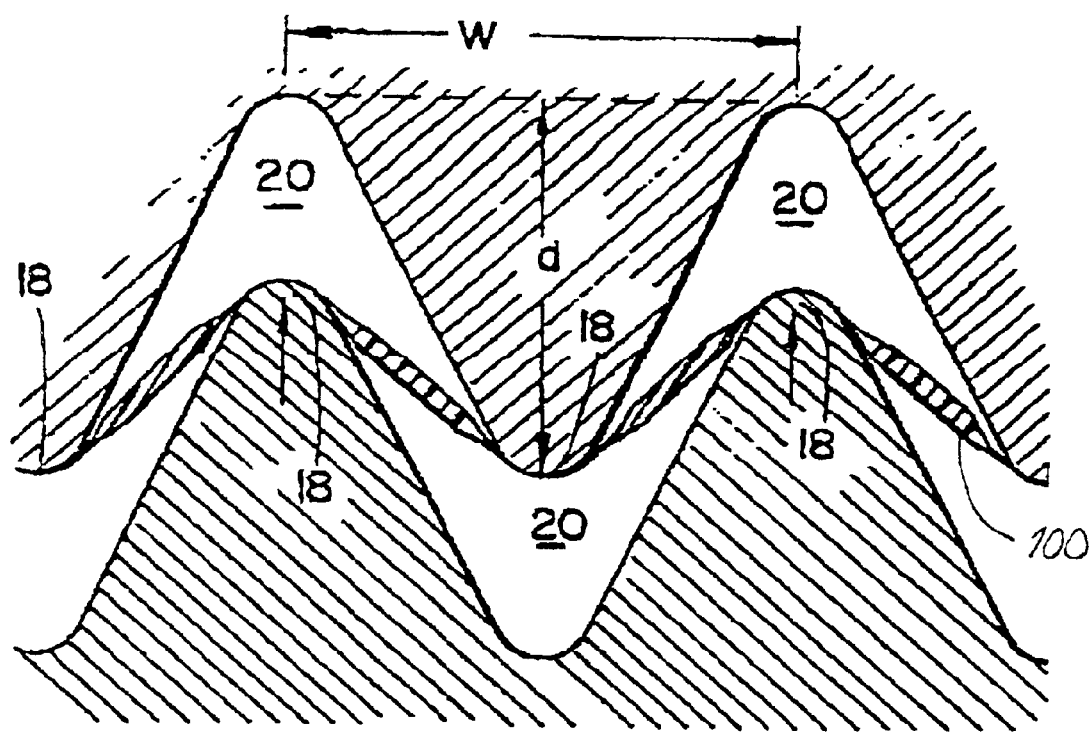
FIG. 1 shows the geometry of interdigitating rollers.

This invention concerns certain breathable films made from a polypropylene and filler blend that exhibit high WVTR, and the ability to be drawn down to low basis weights, as well as methods for making same. Particularly useful in the disclosed films and methods is impact copolymer polypropylene.

This invention further includes certain polypropylenes, their conversion into fabricated articles such as films, articles made from such films, and applications in which such articles having high WVTR combined with good physical properties such as improved dart impact strength, improved tear strength and soft feel are desirable. The resulting films, and film composites, (including coextruded and laminated films) have combinations of properties which render them superior and unique to films or film composites previously available.

The filled polypropylene films disclosed herein are particularly well suited for use in producing certain classes of high WVTR films, consumer and industrial articles which use the filled polypropylene films in combination with, for instance, polymeric woven or non-woven materials. Such consumer articles include, but are not limited to diapers, adult incontinence devices, feminine hygiene articles, medical and surgical gowns and garments, other medical garments, drapes and absorption pads, surgical drapes, industrial apparel, sportswear, building products such as "house-wrap", roofing components, filtration media, controlled atmosphere packaging and the like made using one or more of the films disclosed herein. Additionally the films of the present invention may be used in metallized films with a high WVTR, according to the disclosure of U.S. Pat. No. 5,055,338, which is to be fully incorporated herein by reference in its entirety.

Production of the Films

Films contemplated by certain embodiments of the present invention may be made using polypropylene and film processes including, blow molding, casting, or cast melt embossing. The preferred process is a cast melt embossed film process. In extrusion processes, the films of the present invention can be formed into a single layer film, or one layer or more of a multi-layer film or film composite. Alternatively, the polypropylene films described herein can be formed or utilized in the form of a resin blend where the blend components function to modify the WVTR, the physical properties, the draw-down, the sealing, the cost, or other parameters.

Both blend components and the parameters provided thereby will be well known to those of ordinary skill in the art. The breathable films made from the polypropylene and filler blend of the present invention may also be included in laminated structures. As long as a film, multi layer film, or laminated structure includes one or more polypropylene and filler blend film layers having the WVTR, or draw-down, and the like of the film disclosed herein, such film, multi layer film or laminated structure will be understood to be contemplated as an embodiment of the present invention.

Polyolefin Precursor Film

The polyolefin precursor film component can be any film forming polyolefin blend, as long as the majority of the polyolefin component is a polypropylene. Examples of suitable polypropylene materials are:

| Suitable Polypropylenes & Relative Benefits | | | | |
|---|---|---|---|---|
| Polypropylene Type | Dart Impact Strength | Tear Strength | Softness | Draw-down |
| Exxon Metallocene Achieve ® PD3854 | preferred | preferred | preferred | most preferred |
| Exxon Random Copolymer PP 9263 | more preferred | more preferred | more preferred | more preferred |
| Exxon Impact Copolymer PP 7623 | most preferred | most preferred | most preferred | preferred |
| Exxon Homopolymer PP 1016 | preferred | preferred | preferred | preferred | and combinations thereof.

It will be understood that, in general, we contemplate that a large number of polypropylenes will be useful in the techniques and applications described herein.

Filler

Fillers useful in this invention may be any inorganic or organic material having a low affinity for and a significantly lower elasticity than the film used as the polyolefin precursor. Preferably, the filler should be a rigid material having a non-smooth hydrophobic surface, or a material which is treated to render its surface hydrophobic. The preferred mean average particle size of the filler is between about 0.5–5.0 microns for films generally having a thickness of about 1 to about 6 mils prior to stretching.

Examples of the inorganic fillers include calcium carbonate, talc, clay, kaolin, silica, diatomaceous earth, magnesium carbonate, barium carbonate, magnesium, sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay, etc. Calcium carbonate ($CaCO_3$) is particularly preferred for its low cost, its whiteness, its inertness, and its availability. The selected inorganic filler, such as calcium carbonate is preferably surface treated to be hydrophobic so that the filler can repel water to reduce agglomeration. Also, the surface treatment of the filler should improve binding of the filler to the polyolefin precursor while allowing the filler to be pulled away from the precursor film under stress. A preferred coating for the filler is calcium stearate which is both FDA compliant and readily available.

Organic fillers such as wood powder, and other cellulose type powders may be used. Polymer powders such as Teflon® powder and Kevlar® powder can also be used.

The amount of filler added to the polyolefin precursor depends on the desired properties of the film including dart impact strength, tear strength, WVTR, and stretchability. However, it is believed that a film with good WVTR generally cannot be produced as is taught herein with an amount of filler less than about twenty percent (20%) by weight of the combined polyolefin/filler blend.

The minimum amount of filler (about twenty percent by weight) is needed to assure the interconnection within the polyolefin precursor film of voids created at the situs of the filler—particularly by the stretching operation to be subsequently performed. Further, it is believed that useful films could not be made with an amount of the filler in excess of about seventy percent (70%) by weight of the combined polyolefin/filler composition. It has been found, however, that higher amounts of filler may cause difficulty in compounding and significant losses in strength of the final breathable film. The preferred filler range is about thirty percent (30%) to about seventy percent (70%) by weight, based on the total weight of the combined polyolefin/filler blend. More preferred filler loading will be about forty percent (40%) to about sixty percent (60%) by weight.

While a broad range of fillers has been described at a broad range of inclusion parameters based on weight percentages, still other embodiments of the present invention are contemplated. For instance, fillers with much higher or much lower specific gravity may be included with the polyolefin precursor at amounts outside the weight ranges disclosed. Such polyolefin/filler combinations will be understood to be contemplated as embodiments of our invention as long as the final film, after orientation, exhibits WVTR, or draw-down similar to that described herein.

Film Physical Property Modification

It was also found that the addition of small amounts of low density polyethylene to the polyolefin/filler blend allows film extrusion at higher throughput levels. Low density polyethylene with a Melt Flow Index, as measured using ASTM D1238, of about 0.9 to 25.0 grams per ten minutes (being preferred), and a density of about 0.900 to 0.930 may be used.

Still further improvements in the dart impact strength and tear strength of the film are possible by the addition of plastomers, elastomers, styrenic block co-polymers (styrene-isoprene-styrene, styrene-butadiene-styrene), metallocene catalyzed polyethylene, ethylene propylene elastomer polymers, ethylene propylene diene elastomeric polymers or combinations thereof, Ethylene-vinly-acetate, Ethylene-methacrylate, Ethylene-ethyl-acrylate, and the like, or rubbers. Other commonly available material grades include, but are not limited to, those appearing in the following table.

| Property Improvement Materials | | | |
|---|---|---|---|
| Supplier | Grade | Melt Flow Index | Density |
| Exxon Chemical | Exact 3139 | 7.5 | .900 |
| Exxon Chemical | Exact 4044 | 16.5 | .895 |
| Exxon Chemical | Exact 9095 | 2.2 | .893 |
| Exxon Chemical | Exact 3131 | 3.5 | .900 |
| Exxon Chemical | Paxon SLX 9106 | 2.0 | .900 |
| Exxon Chemical | Paxon SLX 9101 | 3.5 | .900 |
| Dexco | Vector 4211 | 13 | |
| Dexco | Vector 4411 | 40 | |
| Exxon | Vistalon 3708 | | |
| Exxon | Vistalon 3030 | | |
| Shell | Kraton G1657 | 8 | |
| Union Carbide | UC 9042 | 5.1 | .900 |
| Union Carbide | UC 1085 | 0.8 | .884 |

Stretching or Orienting

Final preparation of a breathable film is achieved by stretching the filled polyolefin precursor film to form interconnected voids. Stretching or "orientation" of the film is achieved by incrementally orienting the polyolefin precursor film in the machine direction (MD), transverse direction (TD), or both. Films can be incrementally oriented by a number of mechanical techniques, however, the preferred technique is to stretch the film in the space between pairs of interdigitating rollers, as shown in FIG. 1. Therein it may be seen that the film 100 is contracted by the apex 18 of a plurality of teeth spaced a distance or pitch (W) apart. The apex 18 of each tooth extends into the open space 20 between the teeth on the opposing roller. The amount of interengagement depends both on the tooth depth (d) and the relative position of the rollers.

Figure 2:
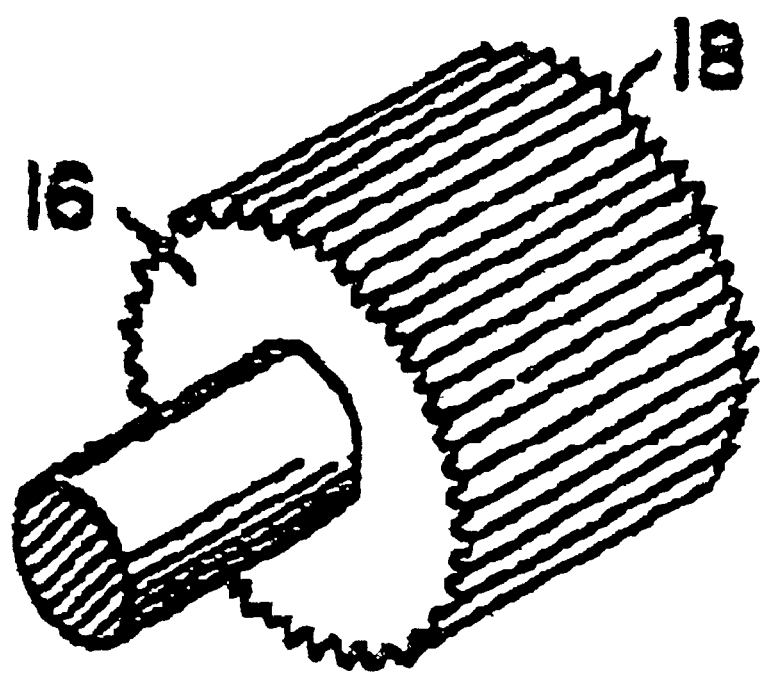
FIG. 2 shows a machine direction orientation roller.
Figure 3:
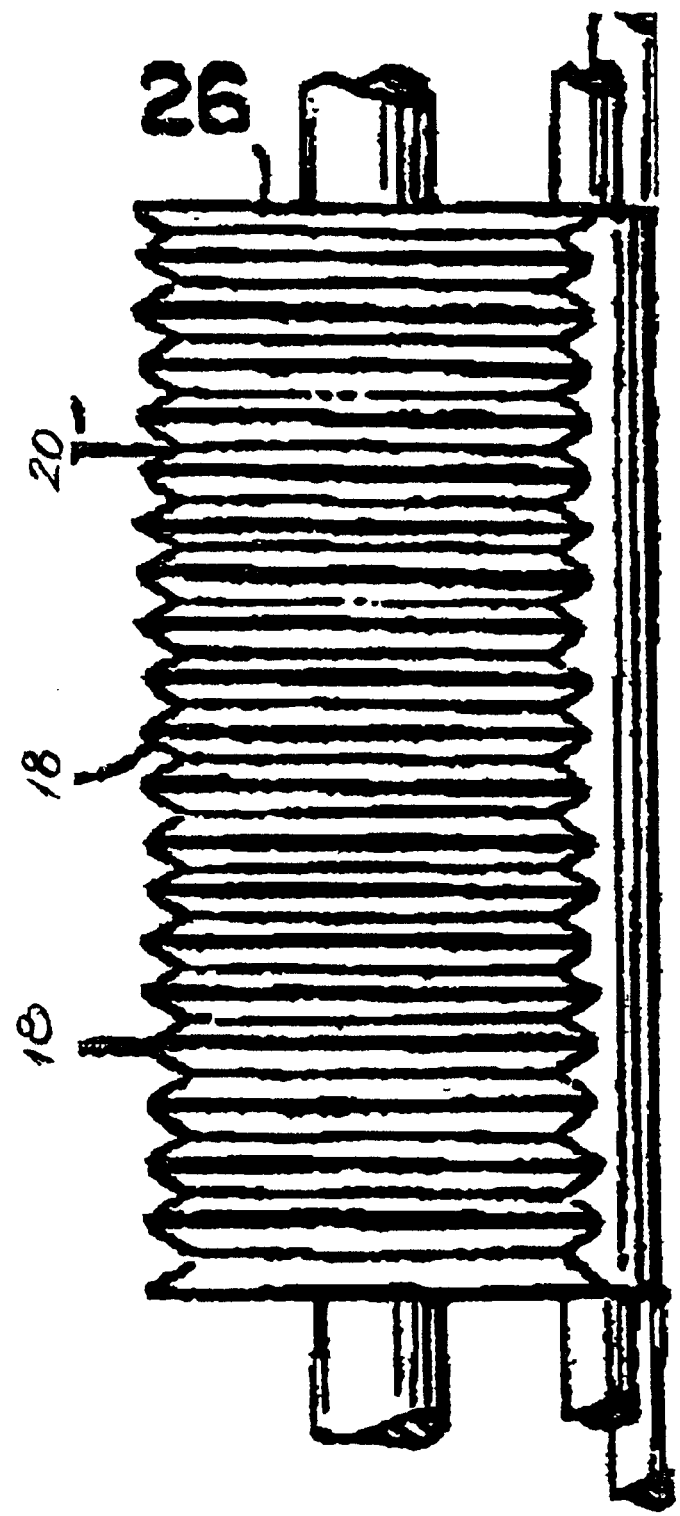
FIG. 3 shows a transverse direction orientation roller.

Machine direction orientation is accomplished by stretching the film through a gear-like pair of rollers 16 as shown in FIG. 2. Transverse direction orientation is accomplished by stretching the film through a pair of disk-like rollers 26 as shown in FIG. 3.

The preferred embodiment employs rollers with a tooth pitch, W=0.080", however a pitch of about 0.040" to 0.500" is also acceptable. The tooth depth (d), is preferably 0.100", however, a tooth depth of about 0.030" to 0.500" is also acceptable. For the transverse direction orientation rollers, as shown in FIG. 3, the depth may be up to about 1.000" as mechanical interference is less of an issue when using transverse direction rollers 26.

The depth of interengagement of the roller teeth determines the amount of orientation imparted on the film. A balance must be drawn between the depth of engagement of the roller teeth and the level of filler in the film, as many physical properties of the film are affected as depicted in the following table.

| Relationships between process and formulation factors | | | | | |
|---|---|---|---|---|---|
| | Adjust | WVTR | Dart Impact | Basis Weight | CD Tensile | MD Tear |
| $CaCO_3$ | Increase | Increase | Decrease | | | Decrease |
| MD Orientation | Increase | Increase | Decrease | Decrease | | Decrease |
| TD Orientation | Increase | increase | Decrease | Decrease | Decrease | |

Properties of Films Produced
WVTR

In an embodiment of the present invention, certain films and articles made therefrom have higher WVTR than previously thought possible. The WVTR of such films should be above about 100 g/m²/24 hr @ 37.8° C., 100% RH, preferably above about 1000 g/m²/24 hr @ 37.8° C., 100% RH, more preferably above about 2000 g/m²/24 hr @ 37.8° C., 100% RH. Some applications benefit from film with up to about 10,000 g/m²/24 hr @ 37.8° C., 100% RH WVTR and above (e.g. garments, etc.).

Test Methods
Water Vapor Transmission Rate (WVTR)

Both a Mocon W1, and a Mocon W600 instrument can be used to measure water evaporated from a sealed wet cell at 37.8° C. through the test film and into a stream of dry air or nitrogen. It is assumed that the relative humidity on the wet side of the film is near 100%, and the dry side is near 0%. The amount of water vapor in the air stream is precisely measured by a pulse modulated infra red (PMIR) cell. Following appropriate purging of residual air, and after reaching a steady state water vapor transmission rate, a reading is taken. WVTR of the test films are reported at Grams of Water/Meter²/Day @ 37.8° C. The output of the unit has been calibrated to the results obtained with a film of known WVTR. Typically, a Celgard 2400 film having a WVTR of 8700 g/m²/day @ 37.8° C. is used as a reference. The testing protocols are based on ASTM 1249-90. The diagram depicted in FIG. 4 illustrates the basic operation of the Mocon units.

Mocon W1

Figure 4:
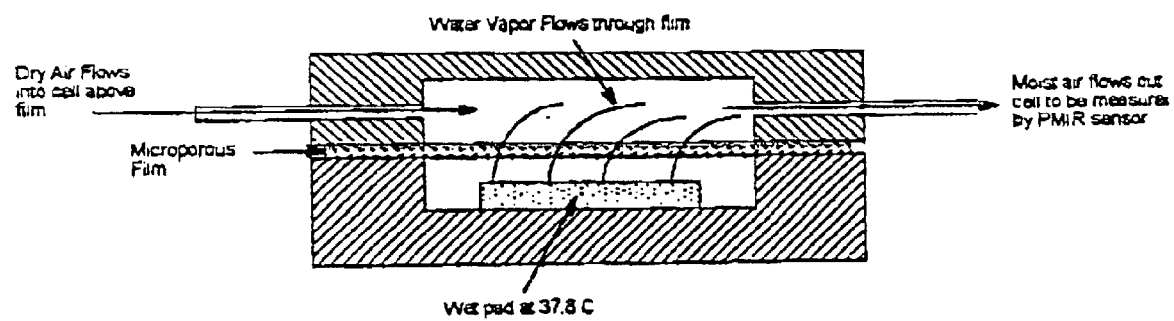
FIG. 4 is a cross-sectional of view of an exemplary Water Vapor Transmission Rate (WVTR) test cell.

As illustrated generally by reference to FIG. 4, the Mocon W1 has a single test cell and an analog chart recorder. Air is pumped through a desiccant dryer, then through the test cell, and then past the PMIR sensor. A five-minute purge of residual air is followed by a six-minute test cycle with controlled air flow. The result is a steady state value for WVTR. The purge and test cycles are controlled manually. The unit is calibrated to a film with a known WVTR every twelve hours. Calibration results are control charted and adjustments are made to the instrument calibration accordingly.

Mocon W600

The Mocon W600 has six measurement cells with PMIR data fed into a computer. Nitrogen is fed through a desiccant dryer, then through the active test cell, then past the PMIR sensor. In addition to data compilation, a computer controls test cycle sequencing. All measurement cells are purged simultaneously for an eight-minute period. This is followed by an eight-minute test cycle for each of the six measurement cells. Total testing time is fifty-six minutes. Two of the six measurement cells always measure reference films with a known WVTR.

EXAMPLES

Example 1

Experimental Grade 300-11-1

A blend of 52% ECC FilmLink 400 $CaCO_3$ was combined with 48% Exxon PD 7623 Impact Copolymer Polypropylene. The film was oriented off line with interdigitating rolls of 0.100" pitch. The MD depth of engagement was 0.030", and the TD depth of engagement was 0.019".

Example 2

Experimental Grade 400-4-1

A blend of 52% ECC FilmLink 400 $CaCO_3$ was combined with 40% Exxon PD 7623 Impact Copolymer, 2% Exxon LD-200.48, 6% Exxon SLX9101. The film was oriented in interdigitating rolls of 0.080" pitch. The MD depth of engagement was 0.028", and the TD depth of engagement was 0.034".

Example 3

Experimental Grade 500-9-3

A blend of 55% ECC FilmLink 400 $CaCO_3$ was combined with 31% Exxon PD 7623 Impact Copolymer, 4% Exxon LD-200.48, 2% Ampacet 110131 $TiO_2$, concentrate, and 8% Exxon Exact 3131. The film was oriented in interdigitating rolls of 0.080" pitch. The MD depth of engagement was 0.021", and the TD depth of engagement was 0.037".

The following table demonstrates the absolute values of tear strength and dart impact strength of the film produced in three examples.

| Table of Example Film Properties | | | |
|---|---|---|---|
| | Example 1 | Example 2 | Example 3 |
| Grade Number | 300-11-1 | 400-4-1 | 500-9-3 |
| Basis Weight (gm/sqm) | 41.0 | 40.6 | 40.3 |
| WVTR (gm/sqm/day) | 1457 | 1462 | 1400 |
| Dart Impact Strength (gm) | 210 | 315 | 315 |
| MD Ultimate (gm/in) | 625 | 609 | 604 |
| MD Elongation (%) | 423 | 482 | 448 |
| TD @ 5% (gm/in) | 231 | 151 | 140 |
| TD Ultimate (gm/in) | 367 | 501 | 440 |
| TD Elongation (%) | 410 | 464 | 398 |
| Light Transmission (%) | 45 | 43 | 39 |
| MD Elmendorf Tear Strength (gm) | 79 | 195 | 198 |

Based on the foregoing, the films produced by the disclosed method have physical properties as described below:

| | |
|---|---|
| WVTR (gm/sqm/day) | 100–10,000 |
| Dart Impact Strength (gm) | 100–300 grams |
| MD Elongation (%) | 150%–550% |
| TD Elongation (%) | 150%–550% |
| MD Elmendorf Tear Strength (gm) | 20–300 grams |

Changes and modifications in the specifically described embodiments can be carried out without departing from the scope of the invention which is intended to be limited only by the scope of the appended claims.

We claim:

1. A method of making a microporous breathable film comprising the steps of:
   selecting a film forming a polyolefin precursor, said polyolefin precursor having polypropylene as a majority component;
   blending said film forming polyolefin precursor with a filler which is a rigid material having a low affinity for the polyolefin precursor and a lower elasticity than the polyolefin precursor, and having a non-smooth hydrophobic surface such that the filler is about 30% to about 70% of the combined weight of the filler and the polyolefin precursor;
   combining said polyolefin precursor/filler blend with an additive selected from a group including a plastomer, an elastomer, a styrenic block copolymer or a combination thereof, wherein said additive has a melt flow index ranging from about 0.8 to about 40 g/10 minutes; and
   stretching the combination of said blended polyolefin/filler blend with an additive to form a microporous breathable film having a dart impact strength in the range of from about 100 to about 300 grams;
   wherein said film has a WVTR in the range of from about 1000 to about 10,000 g/m2/24 hr, and wherein said film has an MD or TD elongation in the range of from about 150% to about 550%.

2. The method as defined in claim 1 wherein said step of stretching the combination uses interdigitating grooved rollers.

3. The method as defined in claim 2 wherein said interdigitating grooved rollers are positioned in a direction selected from the group consisting of machine direction (MD), transverse direction (TD), and a combination thereof.

4. The process as defined in claim 1 wherein said film forming polyolefin precursor is selected from the group consisting of an impact copolymer polypropylene, a random copolymer polypropylene, and a combination thereof.

5. The method as defined in claim 2 further including the step of heat laminating the microporous breathable film having polypropylene as a major component of the polyolefin precursor to a non-woven having polypropylene as a majority component a precursor polyolefin used to form the non-woven.

6. The method as defined in claim 5 further including the step of forming said combinations of microporous breathable film and non-woven polymer into an article selected from the group consisting of diapers, adult incontinence devices, feminine hygiene articles, surgical garments, surgical drapes, sportswear, industrial apparel, house wrap, filtration media, roofing components, and controlled atmosphere packaging.

7. A method of making a microporous breathable film comprising the steps of:
   selecting a film forming a polyolefin precursor, said polyolefin precursor having polypropylene as a majority component; blending said film forming polyolefin precursor with a filler which is a rigid material having a low affinity for the polyolefin precursor and a lower elasticity than the polyolefin precursor, and having a non-smooth hydrophobic surface such that the filler is about 30% to about 70% of the combined weight of the filler and the polyolefin precursor;
   combining said polyolefin precursor/filler blend with an additive selected from a group including a plastomer, an elastomer, a styrenic block copolymer or a combination thereof, wherein said additive has a melt flow index ranging from about 0.8 to about 40 g/10 minutes; and
   stretching the combination of said blended polyolefin/filler blend and said additive to form a microporous breathable film having a dart impact strength greater than about 210 grams; and
   wherein said film has a WVTR in the range of from about 1000 to about 10,000 g/m2/24 hr.

8. The method as defined in claim 7 wherein said step of stretching the combination uses interdigitating grooved rollers.

9. The method as defined in claim 8 wherein said interdigitating grooved rollers are positioned in a direction selected from the group consisting of machine direction (MD), transverse direction (TD), and a combination thereof.

10. The process as defined in claim 7 wherein said film forming polyolefin precursor is selected from the group consisting of an impact copolymer polypropylene, a random copolymer polypropylene, and a combination thereof.

11. The method as defined in claim 8 further including the step of heat laminating the microporous breathable film having polypropylene as a major component of the polyolefin precursor to a non-woven having polypropylene as a majority component a precursor polyolefin used to form the non-woven.

12. The method as defined in claim 11 further including the step of forming said combinations of microporous breathable film and non-woven polymer into an article selected from the group consisting of diapers, adult incontinence devices, feminine hygiene articles, surgical garments, surgical drapes, sportswear, industrial apparel, house wrap, filtration media, roofing components, and controlled atmosphere packaging.

* * * * *